United States Patent [19]

Jones et al.

[11] Patent Number: 5,525,007
[45] Date of Patent: Jun. 11, 1996

[54] SEWER CONSTRUCTION

[75] Inventors: William D. Jones, Warrington, Pa.; Louis A. Esposito, Oxford, Mass.

[73] Assignee: Hail Mary Rubber Co., Inc., Warminster, Pa.

[21] Appl. No.: 403,496

[22] Filed: Mar. 14, 1995

Related U.S. Application Data

[62] Division of Ser. No. 82,595, Jun. 25, 1993.

[51] Int. Cl.$^6$ ................................................. E02B 11/00
[52] U.S. Cl. ................................. 405/52; 52/20; 405/36; 405/51; 405/303
[58] Field of Search ........................... 405/154, 157, 405/36, 50, 51, 303; 52/19, 20; 137/363

[56] References Cited

U.S. PATENT DOCUMENTS

| | | |
|---|---|---|
| 1,582,191 | 4/1926 | Snooke . |
| 1,712,510 | 5/1929 | Monie . |
| 2,816,575 | 12/1957 | Stokes ............................. 405/157 X |
| 3,057,408 | 10/1962 | Griffitts . |
| 3,212,519 | 10/1965 | Paschen . |
| 3,240,512 | 3/1966 | Pennington et al. ............... 405/172 X |
| 3,562,969 | 2/1971 | Little, Jr. . |
| 3,563,825 | 2/1971 | Segura et al. ...................... 405/157 X |
| 3,621,623 | 11/1971 | Downes . |
| 3,715,958 | 2/1973 | Crawford et al. . |
| 3,745,738 | 7/1973 | Singer . |
| 3,774,403 | 11/1973 | Cushing ............................. 405/157 X |
| 4,023,590 | 5/1977 | Harris et al. . |
| 4,127,990 | 12/1978 | Morrow . |
| 4,166,710 | 9/1979 | Spiridonov ........................ 405/172 |
| 4,243,068 | 1/1981 | Sugda et al. . |
| 4,253,282 | 3/1981 | Swartz . |
| 4,333,580 | 6/1982 | Sweigart . |
| 4,333,662 | 6/1982 | Jones . |
| 4,472,911 | 9/1984 | Jooris et al. . |
| 4,621,941 | 11/1986 | Ditcher et al. ...................... 52/20 X |
| 4,737,220 | 4/1988 | Ditcher et al. ...................... 52/20 X |
| 5,040,351 | 8/1991 | Cornwall . |
| 5,054,956 | 10/1991 | Huang . |
| 5,168,862 | 12/1992 | McGee . |
| 5,169,161 | 12/1992 | Jones . |
| 5,189,861 | 3/1993 | Sugda . |
| 5,293,719 | 3/1994 | Sugda . |
| 5,361,799 | 11/1994 | Chilton et al. ...................... 52/20 X |

FOREIGN PATENT DOCUMENTS

| | | |
|---|---|---|
| 58-101935 | 1/1983 | Japan . |
| 61-24728 | 2/1986 | Japan . |
| 22187 | of 1909 | United Kingdom ............. 52/20 |

*Primary Examiner*—Dennis L. Taylor
*Attorney, Agent, or Firm*—Howson and Howson

[57] ABSTRACT

Prefabricated concrete pipe encasements are disclosed for stabilizing underground conduit systems from movement caused by flotation, back filling or settling. In one embodiment, a sewer chimney includes a plastic riser connected between a tee-fitting in a sewer main and a cap block at a branch service line. At least one pipe encasement and a prefabricated concrete base encircles the riser for maintaining alignment with the tee-fitting. In other embodiments the pipe encasement encircles a generally horizontal pipe line.

10 Claims, 2 Drawing Sheets

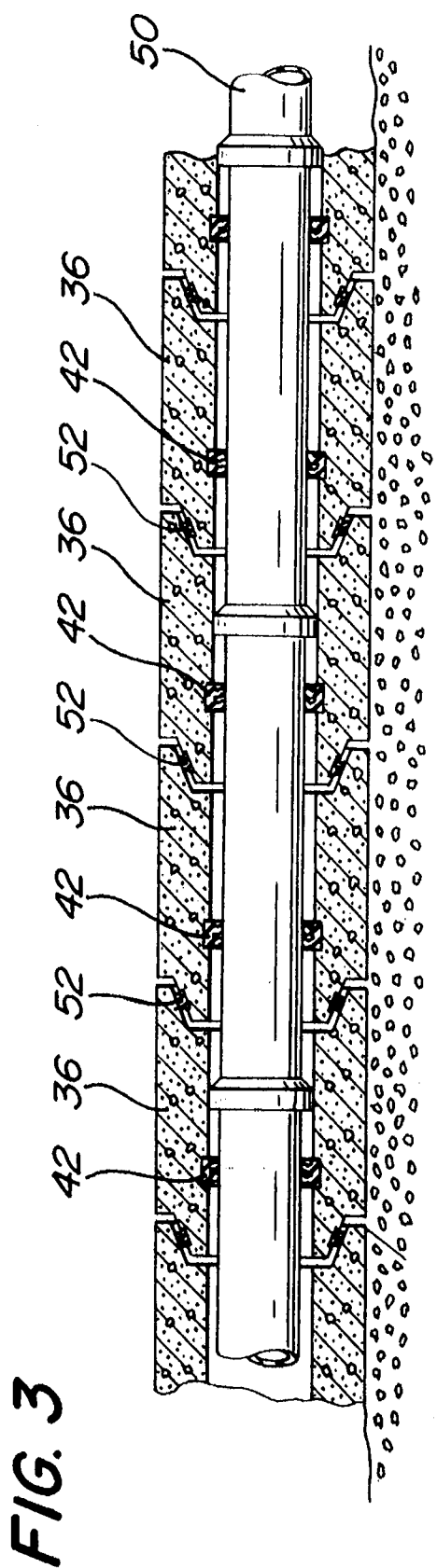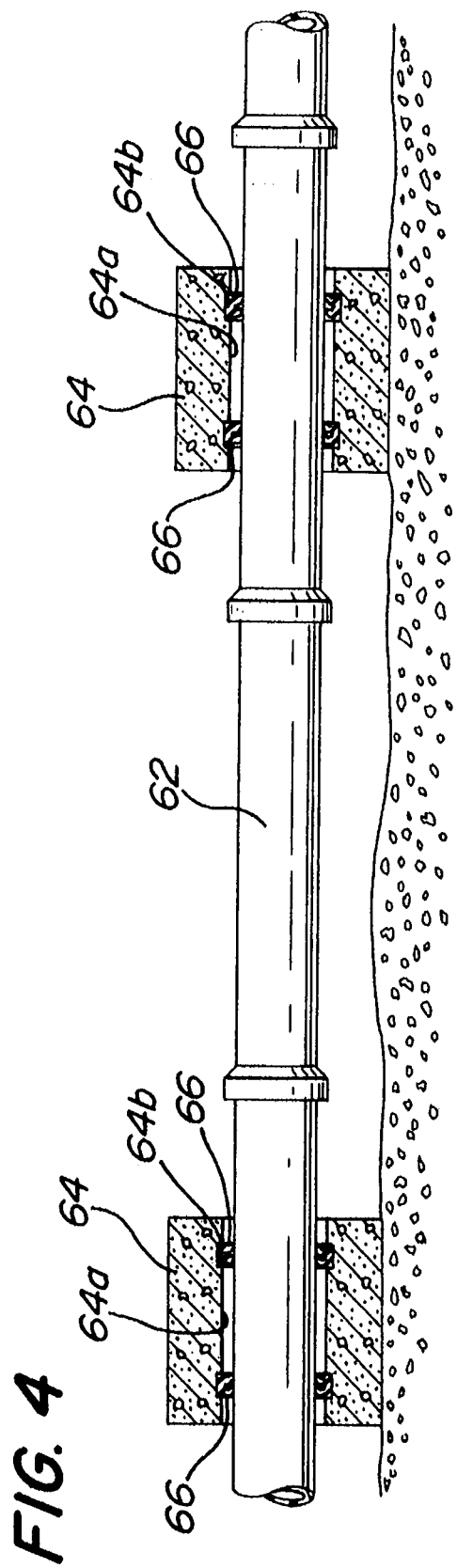

SEWER CONSTRUCTION

This is a divisional of copending application Ser. No. 08/082,595 filed on Jun. 25, 1993.

BACKGROUND OF THE INVENTION

The present invention relates generally to underground fluid conduit systems, and more particularly to a novel and improved underground sewer construction and pipe encasement for sewer chimneys, underground pipe lines, and the like.

Great care must be exercised when installing underground sewer systems in wet or unstable soil situations to assure there will be no leakage at the pipe connections after being placed in service. In particular, lateral shifting of the pipe during back filling an excavated site or later, due to flotation or normal settling, an improperly installed system can produce structural cracks or separations in pipe joints. For example, a newly installed heavy concrete sewer chimney may slowly shift under its own weight in loose back fill and eventually separate where it connects to the main sewer line or to upper branch lines. Similarly, installations of long lines of underground pipe, whether or not bedded in crushed stone, are susceptible to cracks and pipe joint separations due to flotation of the pipe or uneven distribution of backfill or later settling of earth around the pipe. Intermittent voids and unsupported spans, so-called "bridging," occur along the pipe and produce shear and bending stresses which can deform bendable pipes out-of-round and produce leaks, especially at bell-and-spigot joints. In consequence, infiltration or exfiltration of unwanted materials occurs and the affected sites must be completely re-excavated, usually at great expense to correct the faults.

Prior art designs of concrete sewer constructions of monolithic poured-in-place castings or of prefabricated sections assembled at the site have been ineffective in minimizing this occurrence. While the latter type is preferred for many installations because the sections are available in various shapes and sizes, and can be assembled in situ to meet specific requirements, the leakage problem is unfortunately exacerbated because the sections may shift among themselves and introduce more separations Furthermore, slight misalignments of sections at each interface forms a potential shelf for debris to build up and clog. A sewer chimney assembled from prefabricated sections, for example, usually includes one or more concrete riser sections of different lengths stacked between a tee-fitting in a lower main line and a lateral service line. To prevent these sections from shifting and separating due to back filling or settling, they are fastened together at the installation site with metal clips, inserts or bolts. This is a costly and labor-intensive procedure, and with time the fasteners may even fail due to metal fatigue, rust and corrosion, or improper installation in general. A practical solution to these problems is needed.

SUMMARY OF THE INVENTION

Accordingly, it is an object of the present invention to provide a novel and improved prefabricated concrete pipe encasement for stabilizing an underground conduit from shifting due to flotation, back filling or settling.

Another object is to provide a novel and improved sewer chimney assembled from prefabricated concrete modules including pipe encasements which fit the specific requirements of an installation, which permits movement of the modules relative to each other and to connecting pipe lines without leakage due to normal settling of surrounding earth, and which will eliminate infiltration and exfiltration of unwanted materials and reduce the potential for debris to collect at interfacing modules.

A still further object is to provide a prefabricated pipe encasement which is relatively easy to install in an underground conduit system, and which minimizes the risk of completely re-excavating the system in order to repair leaks caused by lateral shifting of conduits due to flotation, back filling or settling.

Briefly, these and other objects of the invention are accomplished with prefabricated concrete pipe encasements which stabilize underground conduits against movement caused by flotation, back filling or settling. In one embodiment for a sewer chimney, a sleeve-like pre-cast concrete pipe encasement encircles a riser of cylindrical plastic pipe. The lower end of the riser is sealingly inserted in a vertical port of a tee-fitting in a sewer main, and the upper end is sealingly inserted in a cap block located at a branch service line. The cap block is connected by a bell-and-socket joint to the pipe encasement, and their combined weight is supported around a bell-and-spigot joint of a bifurcated base which straddles the tee-fitting and rests on the earth or a stone bed on either side. An elastic annular gasket within the pipe encasement resiliently maintains the riser spatially concentric therewith.

A second embodiment comprises a series of the concrete pipe encasements joined end-to-end by their bell-and-spigot joints to completely encircle, with nominal radial clearance, an underground cylindrical pipe line for stabilizing it from lateral movement due to flotation, back filling or settling. The elastic gasket within the bore of each encasement resiliently maintains the pipe line spatially concentric therewith.

A third embodiment comprises a plurality of concrete pipe encasements encircling and stabilizing the cylindrical pipe line at spaced intervals along its length. A pair of axially-spaced elastic annular gaskets in the bore of each encasement resiliently support the pipe line spatially concentric therewith.

For a better understanding of these and other aspects of the invention, reference will be made to the following detailed description taken in conjunction with the accompanying drawings.

BRIEF DESCRIPTION OF THE DRAWINGS

FIG. 3 illustrates in a longitudinal cross section a second embodiment according to the invention of a series of pipe encasements connected end-to-end around a horizontal pipe line; and FIG. 4 represents in longitudinal cross section a third embodiment according to the invention of a plurality of pipe encasements encircling a horizontal pipe line at spaced intervals along the length thereof.

DESCRIPTION OF THE PREFERRED EMBODIMENTS

Figure 1:
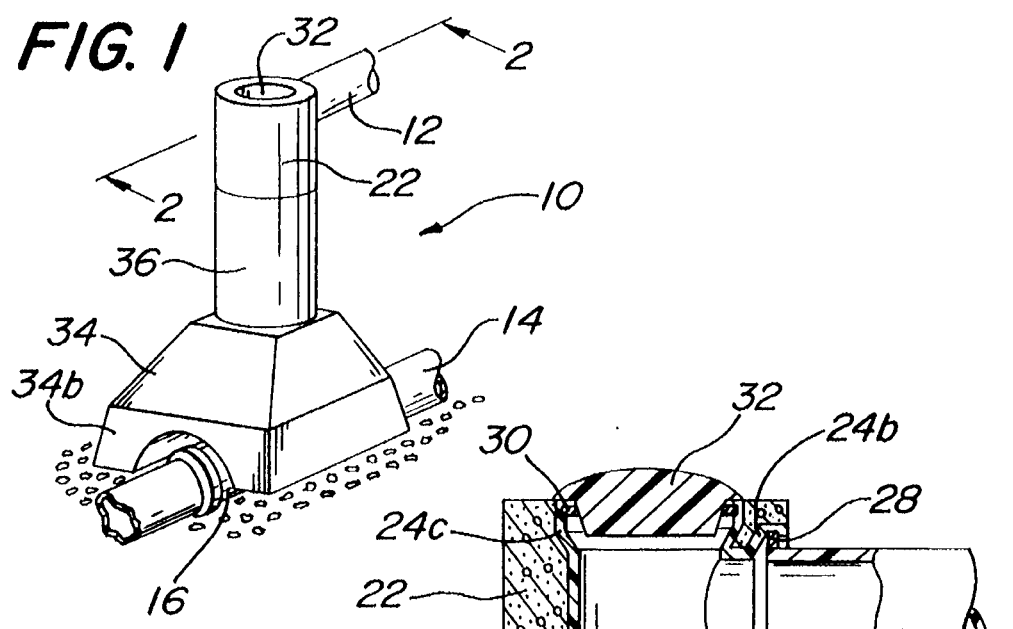
FIG. 1 is a perspective view of one embodiment according to the invention of a sewer chimney with a pipe encasement installed over a lower sewer main.
Figure 2:
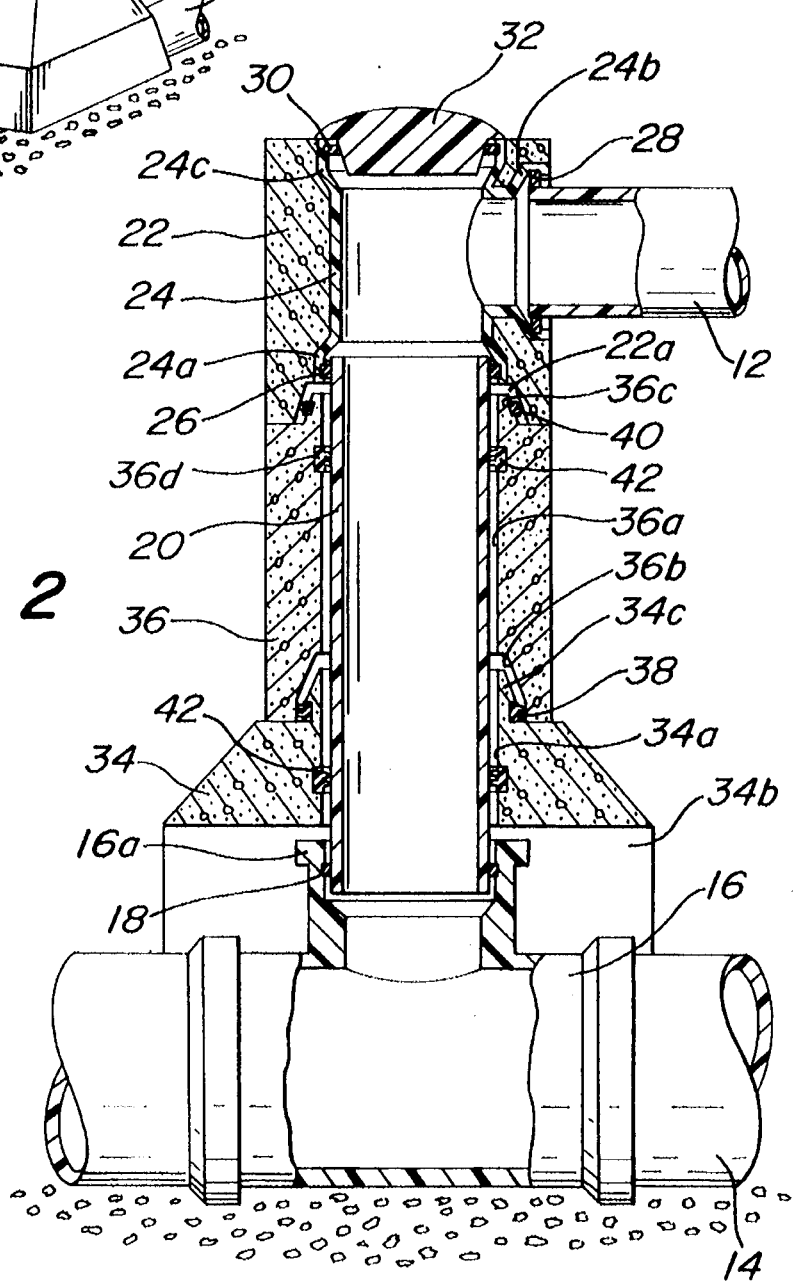
FIG. 2 is a sectional view of the sewer chimney of FIG. 1 taken in a vertical plane passing through the longitudinal axis of the sewer main.

Referring now to the drawings wherein like referenced characters denote like or corresponding parts throughout the several views, there is shown in FIGS. 1 and 2 an underground construction for a sewer chimney, indicated generally by the reference number 10, for conducting an effluent from a lateral service line 12 to a lower horizontal sewer main 14. Chimney 10 is erected in stacked modules over a tee-fitting 16 in sewer main 14. The lower end of a plastic cylindrical pipe or riser 20 is sealingly inserted in a bell socket 16a and a ring seal 18 of a vertical inlet port in tee-fitting 16. The sewer lines and riser are typically 6-inch or 8-inch pipes of standard SDR-35 or C-900 PVC, or ductile iron. A hollow concrete cap block 22 includes a plastic liner 24 with a bell socket 24a and a ring seal 26 adjacent to the bottom of block 22 in which the upper end of riser 20 is inserted, and a bell socket 24b and a ring seal 28 at one side of block 22 for inserting service line 12. Cap block 22 may be rotatably positioned about riser 20 to align bell socket 24b with service line 12. A bell socket 24c and ring seal 30 at the top of block 22 receive a removable cover 32 which facilitates chimney clean-out. Seals 18, 26, 28 and 30 are conventional static types usually furnished by the manufacturer of the tee-fitting and the cap block.

Riser 20 and cap block 22 are supported in coaxial alignment with bell socket 16a of tee-fitting 16 by a base or bridge 34 and an intermediate or pipe encasement 36, each cast in a monolith of steel-reinforced concrete. Bridge 34 includes a central bore 34a which encircles the lower end of riser 20 with a nominal radial clearance, a bifurcated foot 34b symmetrically straddling tee-fitting 16 and resting entirely on an earth or stone bed (not shown), and a tapered single-offset spigot 34c around the top of bore 34a. An elastic gasket 42 in a recess of bore 34a resiliently retains riser 20 spatially concentric within bridge 34. By this unique bridge configuration a design goal for a 20-ton (i.e. H-20) support loading is achieved.

Only one pipe encasement 36 is illustrated, but encasements of various lengths are contemplated for use singly or in combination to reach the correct elevation of a specific chimney installation. Each pipe encasement 36 defines a cylindrical sleeve having a bore 36a surrounding riser 20 with a nominal radial clearance, a bell socket 36b at the lower end receiving spigot 34c with an elastic gasket 38, and a tapered single-offset spigot 36c with an elastic gasket 40 at the upper end. A bell socket 24a extending from the bottom of block 22 concentric with bell socket 22a receives spigot 36c and gasket 40. Bell socket 36b is a complementary match of spigot 36b for enabling pipe encasement 36 to be serially connected to respective bell socket and spigot ends of next adjacent encasements, cap block 22 or bridge 34. Gaskets 38 and 40 retained in recesses around spigots 34c and 36c, respectively, provide sufficient resilience to permit relative movement of the sections normally occurring either during installation or after ground settling. There is also a nominal axial clearance between the lower and upper ends of riser 26 and bell sockets 16a and 24a which permits axial movement without separation for a normal amount of vertical settling. An additional elastic gasket 42 in a recess 36d of bore 36a resiliently retains riser 20 spatially concentric within encasement 36. A triple seal system is thereby provided: (1) riser 20 is sealed at cap block 22 and tee-fitting 16a, (2) riser 20 is sealed within pipe encasement 36, and (3) bell-and-spigot joints are sealed at adjacent concrete modules. Gaskets 38, 40 and 42 are preferably annular ribs such as disclosed in U.S. Pat. No. 5,169,161 issued to W. D. Jones.

The second embodiment of the invention illustrated in FIG. 3 shows an underground pipe line 50 which is stabilized from lateral shifting due to flotation, back filling or ground settling. A series of pre-cast concrete pipe encasements 36 are interconnected end-to-end at their complementary bell-and-spigot joints 52 to completely enclose the pipe line. Each encasement 36 encircles a section of pipe line with nominal radial clearance, and with gaskets 42 preferably lubricated and engaging in tandem-like fashion the circumference of pipe line 50 at equal intervals for maintaining encasement 36 concentric therewith.

The third embodiment of the invention illustrated in FIG. 4 shows an underground pipe line 62 which is stabilized from flotation or lateral shifting by enclosing the pipe line in a plurality of pre-cast concrete pipe encasements 64 located at spaced intervals. Each encasement 64 defines a cylindrical sleeve with a bore 64a encircling a section of pipe line with a nominal radial clearance. Intermediate the ends of each encasement 64 are a pair of axially spaced elastic gaskets 66 retained in recesses 64b in bore 64a which resiliently support pipe line 62 concentric therewith. This arrangement, instead of completely enclosing the pipe line with encasements as illustrated in FIG. 3, is useful where the likelihood of flotation or ground settling is less severe.

Some of the many advantages and novel features of the invention should now be readily apparent. For example, a pipe encasement is provided which will prevent underground conduits from cracking or separating due to lateral shifting caused by flotation back filling or settling. In a sewer chimney, a watertight assembly is provided in which pipe encasements are connected by bell-and-spigot joints and vertically support a smooth, continuous conduit between the sewer main and a cap block near the surface, thereby eliminating potential areas for separation or clogging. Resilient gaskets between the conduit and the pipe encasements allow for maintaining close alignment of modules during installation and back filling. Axial clearance at the ends of the conduit permits normal settling without leakage. Infiltration and exfiltration of unwanted materials is eliminated. Metal clips, inserts, bolts or the like are not needed to secure modular sections of sewer constructions together. The encasements are relatively easy to install without the risk of re-excavation to repair leaks.

It is understood, of course, that various changes in the details, materials, steps and arrangement of parts which have been herein described and illustrated to explain the nature of the invention, may be made by those skilled in the art within the principle and scope of the invention as expressed the appended claims.

What is claimed is:

1. A sewer chimney for connecting a branch service line to an underground sewer main, said chimney comprising:

a pipe fitting providing a branch inlet to the sewer main;

a riser having lower and upper ends, the lower end being inserted in said inlet;

a hollow cap having an inlet formed to receive the service line, and an outlet receiving the upper end of said riser;

a bridge having a bifurcated base formed to be supported by ground on opposite sides and independently of the sewer main, and a centrally located bore encircling the lower end of said riser with a nominal radial clearance; and pipe encasement means connected between said bridge and said cap and having a bore encircling, with a nominal radial clearance, said riser intermediate the ends thereof.

2. A sewer chimney according to claim 1 wherein:

said encasement means is connected at opposite ends thereof to said bridge and cap by bell-and-spigot joints.

3. A sewer chimney according to claim 2 further comprising:

elastic means retained in said encasement means for resiliently maintaining said riser spatially concentric in said bore.

4. An underground construction for connecting an upper pipe line to a lower pipe line, the upper and lower lines having respectively downwardly and upwardly directed bell sockets, said construction comprising:

a single upright cylindrical pipe having an upper end formed to be inserted in the upper pipe line bell socket, and a lower end formed to be inserted in the lower pipe line bell socket;

a base having a bifurcated foot formed to be independently supported on both sides of the lower pipe line bell socket, and a bore encircling, with a nominal radial clearance, the lower end of said pipe; and encasement means secured between said bridge and said upper pipe line bell socket resiliently encircling said pipe.

5. A sewer construction for fluid communication between a hollow cap block and a horizontal sewer main, the sewer main and said cap block having upwardly and downwardly directed ports, respectively, comprising, in combination:

a pre-cast concrete base having a bridge section formed to be supported on either side of the sewer main in spaced relation above the sewer main port, and a first bore vertically aligned with the sewer main port;

a pre-cast concrete encasement mounted on said bridge section having a second bore vertically aligned with said first bore;

a conduit of uniform cross section between upper and lower ends thereof passing with a radial clearance through said first and second bores, the upper end extending above said encasement for connecting to the cap block and the lower end extending below said base for connecting to the sewer main port.

6. A sewer construction according to claim 5 further comprising:

resilient rings secured respectively around said first and second bores and extending inwardly for centering said conduit therein.

7. A sewer construction according to claim 5 further comprising:

an elastic ring secured around the upper end of said conduit formed to seal the downwardly directed port of said cap block thereto.

8. A sewer construction according to claim 5 further comprising:

a resilient ring secured around the lower end of said conduit formed to seal the upwardly directed port of the sewer main thereto.

9. A sewer construction according to claim 5 wherein:

said pipe encasement is connected to said base by a bell-and-spigot joint.

10. A sewer construction according to claim 9 further comprising:

a resilient ring sealingly compressed between said bell-and-spigot joint.

* * * * *